United States Patent [19]

Kookootsedes et al.

[11] Patent Number: 4,701,017

[45] Date of Patent: Oct. 20, 1987

[54] TOUCH POSITION SENSITIVE OPTICAL WAVEGUIDES

[75] Inventors: Gust J. Kookootsedes; Herschel H. Reese, both of Midland; Beth I. Gutek, Freeland; Gale H. Pretzer, Hemlock, all of Mich.

[73] Assignee: Dow Corning Corporation, Midland, Mich.

[21] Appl. No.: 835,507

[22] Filed: Mar. 3, 1986

[51] Int. Cl.$^4$ .................. C08G 77/06; G02B 6/12
[52] U.S. Cl. .................. 350/96.34; 350/96.12; 428/425.5; 428/429; 428/447; 525/478; 528/15; 528/31; 528/32
[58] Field of Search ............ 350/96.11, 96.12, 96.13, 350/96.14, 96.15, 96.29, 96.30, 96.34; 428/425.5, 429, 447, 448; 525/477, 478; 528/15, 31, 32

[56] References Cited

U.S. PATENT DOCUMENTS

| | | | |
|---|---|---|---|
| 3,036,985 | 5/1962 | Daudt | 260/42 |
| 3,341,490 | 9/1967 | Burdick et al. | 260/37 |
| 3,436,366 | 4/1969 | Modic | 260/37 |
| 3,915,924 | 10/1975 | Wright | 260/37 SB |
| 4,472,470 | 9/1984 | Modic | 428/145 |
| 4,484,179 | 11/1984 | Kasday | 340/365 P |
| 4,511,620 | 4/1985 | Kroupa et al. | 428/425.5 X |
| 4,528,243 | 7/1985 | Kookootsedes et al. | 428/425.5 |
| 4,529,789 | 7/1985 | Kroupa | 528/15 |
| 4,535,141 | 8/1985 | Kroupa | 528/15 |

FOREIGN PATENT DOCUMENTS 565247 10/1958 Canada .

*Primary Examiner*—John Lee
*Attorney, Agent, or Firm*—Robert Spector

[57] ABSTRACT

Touch position sensitive optical waveguides comprise a layer of optically transparent polyorganosiloxane elastomer exhibiting a hardness of up to 100 on the Shore 00 scale. The elastomer layer is the product of a hydrosilation reaction and at least one surface of the layer bears a dirt- and puncture-resistant coating formed from a polyurethane, a polyorganosiloxane or an organosiloxane/urethane copolymer. The compressability, compressive strength and resiliency of the waveguide are within specified limits.

12 Claims, No Drawings

TOUCH POSITION SENSITIVE OPTICAL WAVEGUIDES

BACKGROUND OF THE INVENTION

1. Field of the Invention

This invention relates to touch position sensitive optical waveguides. One embodiment of this invention relates to touch position sensitive waveguides in the form of screens that can be used to provide user generated feedback in response to information displayed on a synchronized light source such as a cathode ray tube (CRT).

2. Description of the Prior Art

In certain applications of computers a user gains access to information by selecting options from a menu displayed on a CRT. One method for making such a selection is by entering on a typewriter keyboard a letter or number from the menu that corresponds to the desired selection. The user may be required to make selections from a series of menus before being able to view the desired information. This operation is tedious and requires considerable time, particularly if the user is not familiar with the keyboard. The process could be considerably simplified if the user were able to indicate a selection by touching the location on the CRT screen where the desired selection appears.

U.S. Pat. No. 4,484,179, which issued to Leonard R. Kasday on Nov. 20, 1984 discloses various types of touch position sensitive optical waveguides in the form of screens that provide user generated feedback in response to information appearing on a CRT. FIGS. 8 and 9 of this patent depict a flexible screen that is normally separated by a narrow air gap from the face of the CRT. A user desiring to make a selection depresses a point on the surface of the screen by applying finger pressure, thereby bringing the corresponding point on the opposite surface of the screen into contact with the face of the CRT. When this occurs, those light rays which enter the screen and contact the user's finger are diverted from their normal path and are transmitted by internal reflection to the perimeter of the waveguide where they are detected by a number of photodiodes. The electrical signals generated by the photodiodes are analyzed electronically to determine the location at which the screen was depressed.

To function effectivley, touch position sensitive screens of the type described in the Kasday patent must be transparent enough for the user to view the information being displayed on the CRT. The screen must also transmit an amount of internally reflected light sufficient to activate the aforementioned photodiodes. In addition the screen should be capable of being deflected sufficiently to activate the photodiodes under light to moderate finger pressure and should recover its initial contour relatively rapidly once the deforming pressure is removed. Kasday teaches fabricating a flexible embodiment of a touch position sensitive screen from a transparent silicone rubber. For one reason or another many types of optically transparent materials classified "silicone rubber" are unsatisfactory for this application.

Silicone rubbers are typically polyorganosiloxanes, such as polydimethylsiloxanes, that have been cured, for example by heating them in the presence of an organic peroxide. Other methods for curing polyorganosiloxanes at ambient and elevated temperatures are known to those skilled in this art.

Cured rubbers prepared from polydiorganosiloxanes are typically relatively weak and must be combined with reinforcing agents such as finely divided silica or an organosiloxane resin to achieve the level of tensile and recovery properties required for an optical waveguide. Optically transparent silicone rubber containing these fillers are disclosed in the following U.S. Pat. Nos. 3,341,490, which issued on Sept. 12, 1967 to Burdick et al.; 3,436,366, which issued to Modic on Apr. 1, 1969; 3,915,924, which issued to Wright on Oct. 28, 1975; and Canadian patent No. 565,247, which issued to Daudt on Oct. 28, 1958. None of these patents disclose pressure sensitive optical waveguides or the criteria to be used in selecting organosiloxane reactants and fillers appropriate for these devices from the broad classes of materials described in the patents. Without a knowledge of the invention defined hereinafter one cannot use the teaching of these patents to prepare optically transparent elastomers exhibiting the properties such as compressibility and resiliency required for a touch position sensitive screen or other optical waveguide device.

One disadvantage of silica-filled compositions is that they may not transmit sufficient light of the wavelength required to activate the photodiodes located at the perimeter of the screens described in the aforementioned Kasday patent.

Liquid curable polyorganosiloxane compositions that include vinyl terminated polydiorganosiloxane, a resinous organosiloxane copolymer containing dimethylvinylsiloxy, trimethylsiloxy and $SiO_{4/2}$ units and two types of organohydrogensiloxanes are disclosed in U.S. Pat. No. 4,535,141, which issued to Kroupa on Aug. 13, 1985. One of the organohydrogensiloxanes described in the Kroupa patent contains silicon-bonded hydrogen atoms only at the terminal positions of a substantially linear molecule and is present in an amount equivalent to a concentration of silicon-bonded hydrogen atoms that is at least 1.6 times the number of vinyl radicals present in the curable composition. The other organohydrogensiloxane contains an average of at least 3 silicon-bonded hydrogen atoms per molecule.

We have found the cured elastomers prepared using the compositions described in the Kroupa patent to be less than entirely satisfactory materials for touch sensitive optical waveguides because the cured elastomer continues to harden with the passage of time and eventually becomes too hard for use as a touch sensitive optical waveguide. This phenomenon is often accompanied by the appearance of bubbles of hydrogen gas that interfere with the optical properties of the waveguide. The gradual hardening and generation of hydrogen are believed due to the reaction of the silicon-bonded hydrogen atoms present in the elastomer with moisture.

We have also found waveguides containing the preferred elastomer compositions disclosed in the aforementioned Kroupa patent to have relatively poor compressive strength. These materials may therefore not be capable of withstanding the repeated compression experienced by a touch sensitive screen of the type described in the aforementioned Kasday patent.

Another shortcoming of many prior art polyorganosiloxane elastomers and gels that would otherwise be suitable for use in a touch position sensitive screen is the absence of a smooth, readily cleanable surface that is aesthetically attractive to potential users of the device. Others, like the elastomer described in the aforementioned Kroupa patent, would probably not be sufficiently "tough" to withstand repeated deformation without fracturing, tearing or puncturing.

It is known to modify the surface properties of elastomeric polyorganosiloxanes, particularly their tactile aestheics and tendency to attract dirt and other impurities present in the atmosphere, by coating the elastomer with an adherent material that forms a smooth, readily cleanable layer. A shortcoming of many such materials is that they adversely affect those properties that make the uncoated elastomer suitable for use as a touch position sensitive optical waveguide.

U.S. Pat. No. 4,472,470, issued to Modic on Sept. 18, 1984, is directed toward dirt resistant coatings exhibitng hardness values of at least about 70 on the Shore A durometer scale. These would be too hard for use as the elastomer position of a touch-sensitive waveguide.

An objective of this invention is to provide touch position sensitive screens and other optical waveguides suitable for providing user generated feedback in conjunction with a synchronized light source such as a cathode ray tube. An additional objective of this invention is to provide polyorganosiloxane elastomers and coating materials that can be incorporated into touch position sensitive optical waveguides.

SUMMARY OF THE INVENTION

The touch position senstive optical waveguides of this invention comprise a coated layer of resin reinforced, optically transparent polyorganosiloxane elastomer. The elastomer exhibits a hardness of up to 10 on the Shore A durometer scale and is the product of a hydrosilation reaction that preferably includes a difunctional organohydrogensiloxane as one of the reactants. The coating is elastomeric, dirt-and puncture resistant and is formed from a polyurethane, a polyorganosiloxane or an organosiloxane/urethane copolymer. To function effectively the compressibility, compressive strength and resiliency of the waveguide are within specified limits.

DETAILED DESCRIPTION OF THE INVENTION

This invention provides a transparent touch position sensitive optical waveguide exhibiting a thickness of at least 2.5 mm and consisting essentially of a layer of cured, resin reinforced polyorganosiloxane elastomer having two substantially parallel major surfaces, at least one of which is bonded to a dirt- and puncture resistant coating, where said elastomer exhibits a hardness of from 0, measured using the Shore 00 durometer scale, to a value of 10, measured using the Shore A durometer scale, and is the product of a hydrosilation reaction between the ingredients of a composition comprising:

A. at least one liquid polydiorganosiloxane exhibiting a viscosity of from 0.1 to 40 Pa.s at 25° C. and containing either a vinyl radical or a silicon-bonded hydrogen atom at each of the two terminal positions;

B. an amount of an organosiloxane crosslinking agent sufficient to produce said elastomer by a hydrosilation reaction between said crosslinking agent and the other ingredients of said composition;

C. from 5 to about 40 percent, based on the total weight of said composition, of a benzene soluble copolymer comprising triorganosiloxy units of the general formula $R''_3SiO_{\frac{1}{2}}$, diorganovinylsiloxy units of the general formula $CH_2=CH(R''')_2SiO_{\frac{1}{2}}$, and $SiO_2$ units, where $R''$ and $R'''$ are individually monovalent hydrocarbon or halohydrocarbon radicals containing from 1 to about 20 carbon atoms and free of ethylenic unsaturation, the molar ratio of combined triorganosiloxy units and diorganovinylsiloxy units to $SiO_2$ units is from 0.7 to 1.2 and said copolymer contains from 0.1 to 8 weight percent of silicon-bonded vinyl radicals; and D. a platinum-containing hydrosilation catalyst in an amount sufficient to cure said composition to said elastomer; where the molar ratio of silicon-bonded hydrogen atoms to vinyl radicals in said composition does not exceed 1:1, said coating is formed from a polymeric material selected from the group consisting of (a) polyurethanes derived from aromatic, aliphatic or cycolaliphatic diisocyanates and organic polyols, (b) polyorganosiloxanes and (c) block copolymers comprising (1) repeating units of a polyurethane and (2) up to 50 mole percent, based on total repeating units in said block copolymer, of diorganosiloxane units; and where the compressibility at any point on a coated surface of the waveguide is such that the force required to depress said surface a distance of 1 mm is no greater than 200 grams applied using a 1.6 cm.- diameter sphere, a coated surface of said waveguide resists fracturing under a force of 5 kg applied using a 1.6 cm.-diameter sphere, and the waveguide recovers at least 95% of its initial thickness within one second after being compressed up to 50% of its initial thickness for a period of up to one minute.

As applied to the present optical waveguides the term "transparent" implies that 1) the transmittance for visible and infra-red light, measured between any two points along the perimeter of the waveguide is at least 85%, the haze value does not exceed 20%, and the yellowness index is less than six units. Both haze and yellowness are measured in a direction perpendicular with respect to the major surfaces of the waveguide. Transmittance, haze and yellowness index are measured using a Model D25P-9 Tristimulus Colorimeter manufactured by Hunter Labs.

The Elastomeric Polyorganosiloxane Layer

The layer of polyorganosiloxane elastomer that constitutes the major portion of the present optical waveguides consists essentially of the product obtained by a platinum catalyzed hydrosilation reaction involving at least one polydiorganosiloxane containing terminal vinyl radicals or silicon-bonded hydrogen atoms, a vinyl-containing resinous copolymer as the reinforcing agent and a crosslinking agent. Each of these reactants will now be described in greater detail.

1. The Polydiorganosiloxane

Polydiorganosiloxanes suitable for preparing the cured elastomers of this invention can be represented by the general formula

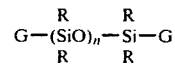

where R represents a monovalent hydrocarbon radical or a monovalent halohydrocarbon radical, G represents hydrogen or a vinyl radical, and n represents a degree of polymerization equivalent to a viscosity of from 1 to about 40 Pa.s at 25° C.

The radical represented by R can contain from 1 to about 20 carbon atoms. A range of from 1 to 10 carbon atoms is preferred. Most preferably R is methyl, phenyl or 3,3,3-trifluoropropyl and G is vinyl, this preference being based on the availability of the reactants typically used to prepare the polydiorganosiloxane ingredient.

The reaction mixture can contain a single polydiorganosiloxane ingredient. Alternatively two or more polydiorganosiloxanes of different molecular weights can be present. We have found that the physical properties of the cured elastomer, particularly resiliency and tear strength, are improved by using a combination of high and low molecular weight polydiorganosiloxanes. In preferred embodiments the low molecular weight species exhibits a viscosity of from about 0.1 to about 3 Pa.s at 25° C. and the high molecular weight species exhibits a viscosity of from 20 to about 40 Pa.s at 25° C.

While not willing to be bound by any theory, the improvement in physical properties observed using the preferred polydiorganosiloxane compositions described hereinabove is believed to result from a variation in crosslink density within the cured elastomer. This concept is explained in greater detail hereinafter.

2. The Crosslinking Agent

The polydiorganosiloxane ingredient and organosiloxane copolymer reinforcing agent are cured by a hydrosilation reaction between silicon-bonded hydrogen atoms and vinyl radicals. In one embodiment a polydiorganosiloxane containing terminally substituted vinyl radicals reacts with a relatively low molecular weight, liquid organosiloxane crosslinking agent containing an average of at least three silicon-bonded hydrogen atoms per molecule. This reaction is conducted in the presence of the vinyl-containing organosiloxane copolymer referred to hereinabove.

In a second embodiment the unsaturated hydrocarbon radicals are present in the crosslinking agent and the polydiorganosiloxane contains silicon-bonded hydrogen atoms.

Preferably the crosslinking agent comprises an organohydrogensiloxane containing an average of at least three silicon-bonded hydrogen atoms per molecule. This ingredient contains from as few as four silicon atoms per molecule up to an average of 50 or more, and can have a viscosity of up to 10 Pa.s or higher at 25° C. The repeating units that can be present in this ingredient include but are not limited to $HSiO_{1.5}$, $R'HSiO$ and/or $R'_2HSiO_{0.5}$ in addition to one or more of monoorganosiloxane, diorganosiloxane, triorganosiloxy and $SiO_2$ units. In these formulae R' is a monovalent hydrocarbon or halocarbon radical as defined hereinabove for the R radical of the polydiorganosiloxane. Alternatively the organohydrogensiloxane can be a cyclic compound containing diorganosiloxane and organohydrogensiloxane units or a compound of the formula $Si(OSiR'_2H)_4$.

R' is preferably methyl, phenyl or 3,3,3-trifluoropropyl. Most preferably R' is methyl and the crosslinking agent is a linear trimethylsiloxy terminated dimethylsiloxane/methylhydrogensiloxane copolymer containing an average of from 10 to about 50 repeating units per molecule of which from 3 to 5 are methylhydrogensiloxane.

To achieve an optimum combination of compressive strength, compressibility and resilience in the final waveguide, a relatively low molecular weight difunctional reactant referred to in the art as a "chain extender" is included in the hydrosilation reaction mixture. The chain extender is typically a diorganohydrogensiloxy, terminated polydiorganosiloxane: containing an average of up to 50 diorganosiloxane units per molecule. Preferred chain extenders contain from 10 to 50 dimethylsiloxane units per molecule. Chain extenders of this type are described, for example, in U.S. Pat. No. 3,697,473, which issued to Polmanteer et al. on Oct. 10, 1972 and is incorporated herein by reference as a teaching of suitable chain extenders.

The chain extender can provide from about 10 up to 85 percent of the silicon-bonded hydrogen atoms present in the curable compositions used to prepare the elastomer portion of the present optical waveguides. Preferably this range is from 30 to about 70 percent and the chain extender is a dimethylhydrogensiloxy terminated polydimethylsiloxane.

The molecular weights of the polydiorganosiloxane and crosslinking agent together with the number and distribution of the silicon-bonded hydrogen atoms and vinyl radicals within the reactants used to prepare the elastomer will determine the location of crosslinks in the cured material. The concentration of crosslinks per unit volume is often referred to as the "crosslink density" and determines certain physical properties of the cured elastomer, particularly hardness, compressibility and resiliency. The particular combinations of polydiorganosiloxane(s), crosslinking agent(s) and organosiloxane copolymer yielding the optimum combination of these physical properties can readily be determined by routine experimentation with a knowledge of this invention.

3. The Organosiloxane Copolymer

Elastomers prepared by reacting a polydiorganosiloxane with a crosslinking agent have relatively poor tensile properties and tear resistance. This deficiency is often remedied by addition of a solid reinforcing filler such as finely divided silica. Because the present waveguides must be transparent in both the visible range and the range of wavelengths required to activate the photodetectors located at the perimeter of the waveguide, solid reinforcing agents such as finely divided silica typically cannot be used. Instead, the required reinforcement is obtained by using from about 5 to about 40 percent, based on the weight of the reactants employed to prepare the copolymer, of a vinyl-containing organosiloxane copolymer referred to hereinabove. These copolymers react during curing and are thereby incorporated into the structure of the polyorganosiloxane elastomer.

We believe that less than about 5 percent by weight of the copolymer will usually not impart the required resiliency and toughness to the cured elastomer, while more than about 40 percent by weight of the copolymer may increase the viscosity of the elastomer precursor to the extent that it cannot be readily blended and poured or otherwise transferred from one location to another under conventional conditions of temperature and pressure. A more serious disadvantages of using a excessive amount of the copolymer is the increase in hardness of the cured elastomer to a point beyond which the surface of the waveguide can be deflected to the extent required to activate the associated photodetectors under an acceptable amount of finger pressure exerted by the user of the waveguide.

The copolymer contains repeating units of the general formula $SiO_2$ in addition to triorganosiloxy units of the general formulae $R''_3SiO_{\frac{1}{2}}$ and diorganovinylsiloxy units of the general formula $CH_2=CH(R''')_2SiO_{\frac{1}{2}}$. The copolymer may also contain up to about 10 mole percent of diorganosiloxy units corresponding to the formula $R_2''SiO$.

In these formulae R'' and R''' are individually monovalent hydrocarbon or halohydrocarbon radicals containing from 1 to about 20 carbon atoms, as previously defined for the R radicals of the polydiorganosiloxane component, and both R'' and R''' are free of ethylenic unsaturation.

The molar ratio of the combination of triorganosiloxy units and diorganovinylsiloxy units to $SiO_2$ units in the copolymer is from 0.7 to 1.2, inclusive. Vinyl radicals constitute from 0.1 to 8 percent, preferably from 0.5 to 5.0 percent, by weight of the copolymer, which preferably contains at least two vinyl radicals per molecule. In preferred embodiments the ranges for the molar ratio of diorganovinylsiloxy:triorganosiloxy:$SiO_2$ units are 0.08–0.1:0.06–1:1.

The copolymers can be prepared as described in U.S. Pat. No. 2,676,182, which issued to Daudt and Tyler on Apr. 20, 1954, and is hereby incorporated in this specification by reference thereto. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxane capping agent than the concentration range taught by Daudt et al.

Briefly, the method of Daudt et al. comprises reacting a silica hydrosol under acidic conditions with the appropriate amount of hexamethyldisiloxane or trimethylchlorosilane. The copolymers used to prepare the present elastomers can be obtained by reacting Daudt et al's. product with the required amount of a hexaorganodisilazane or a hexaorganodisiloxane wherein each silicon atom contains a vinyl radical and two methyl or other hydrocarbon radicals represented by R''' in the foregoing formula.

To ensure compatibility of the reactants and transparency of the cured polyorganosiloxane elastomer it is preferable that the silicon-bonded hydrocarbon radicals present on the polydiorganosiloxane, crosslinking agent and reinforcing agent be identical. Most preferably these hydrocarbon radicals are methyl or a combination of methyl and phenyl.

The molar ratio of silicon-bonded hydrogen atoms to vinyl or other ethylenically unsaturated hydrocarbon radicals present in the reaction mixture is a critical factor in determining the properties of the cured elastomer. The preferred ratio for a given reaction mixture will be determined at least in part by the molecular weight of the polydiorganosiloxane(s), the type of crosslinking agent and the weight percent of organosiloxane copolymer.

Because of the difficulties that can be experienced in achieving a complete reaction between all of the silicon-bonded hydrogen atoms and all of the vinyl radicals present in the reaction mixture, it is desirable to have an excess of one of these reactive species present during curing of the present elastomers. We have found that a stoichiometric excess of silicon-bonded hydrogen atoms often cause a gradual hardening of the cured elastomer over a period of several weeks or months to the extent that the surface of the waveguide cannot be depressed sufficiently to activate the photodetectors in response to exertion of normal finger pressure by a user of the waveguide. This hardening may be accompanied by the generation of hydrogen gas that becomes entrapped as bubbles within the cured elastomer and interferes with the operation of the waveguide. To avoid this problem the present compositions contain a stoichiometric excess of vinyl radicals. Most preferably the molar ratio of vinyl radicals to silicon-bonded hydrogen atoms is from 2:1 to 4:1. It should be understood that allyl or other ethylenically unsaturated hydrocarbon radical can partially or completely replace the vinyl radicals in the present curable compositions.

4. The Platinum Containing Catalyst and Optional Inhibitor

Hydrosilation reactions are typically conducted in the presence of a catalyst that is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatability with the organosiloxane reactants. These complexes are described in U.S. Pat. No. 3,419,593 that issued to David N. Willing on Dec. 31, 1968. Complexes with low molecular weight organosiloxanes wherein the silicon-bonded hydrocarbon radicals are vinyl and either methyl or 3,3,3-trifluoropropyl are particularly preferred because of their ability to catalyze a rapid curing of the elastomer at temperatures of at least about 70° C.

The platinum-containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures containing all of the foregoing reactants and a hydrosilation catalyst may begin to cure at ambient temperature. To increase the storage stability of the curable composition under these conditions or obtain a longer working time or "pot life" the activity of the catalyst can be retarded or suppressed under ambient conditions by the addition of an inhibitor.

A suitable class of inhibitors includes the acetylenic compounds disclsed in U.S. Pat. No. 3,445,420, which issued on May 20, 1969 to Kookootsedes et al. Acetylenic alcohols such as 2-methyl-3- butyn-2-ol constitute a preferred class of inhibitors that will suppress the activity of the catalyst at 25° C. Compositions containing these inhibitors typically require heating at temperatures of 70° C. or above to cure at a practical rate.

If it is desired to increase the pot life of a curable composition at room temperature, this can be accomplished using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

5. Properties of the Curable Composition and Cured Elastomer

Curable compositions containing the ingredients described in the preceding paragraphs typically exhibit viscosities of up to 100 Pa.s at 25° C. To facilitate blending and transfer of the compositions and minimize entrapment of air during mixing a viscosity of from 0.5 to 10 Pa.s at 25° C. is preferred.

Cured polyorganosiloxane elastomers suitable for use in the optical waveguides of this invention exhibit a hardness of from about 0, measured on the Shore 00 durometer scale, to 10 on the Shore A durometer scale. These values are measured in accordance with test method No. D-2240 of the American Society of Testing and Materials (ASTM).

The actual hardness of the elastomers measuring 0 on the Shore 00 scale can be determined using a penetrometer equipped with a weighted cylindrical probe measuring 6.4 mm in diameter. The weight of the probe and associated rod that is exerted on the sample is 19.5 grams. The softest elastomer of this invention will allow the probe to penetrate a distance of 3 mm at 25° C.

The minimum thickness of the elastomer layer is a function of user prefernce and the amount of internally reflected light required to activate the photodetectors located at the perimeter of the screen. User preference is based on the minimum distance a user wishes to be able to depress the surface of the waveguide in order to activate the associated device and the force required to achieve this. Typically the waveguide should be at least 2 millimeters thick to satisfy all of these requirements.

B. The Coating

The optical waveguides of this invention are coated on at least one surface with an adherent, dirt resistant film formed from a polyurethane, a copolymer containing urethane groups and up to 50%, based on total repeating units, of diorganosiloxane units, or one of the dirt resistant polyorganosiloxane coating compositions disclosed in the prior art. In addition to providing an aesthetically attractive surface, films of these polymers are sufficiently strong to resist being punctured or torn during use when subjected to a user's finger pressure. In addition the coating should preferably be sufficiently resilient that it does not retain the impression of pointed objects such as fingernails and pencils with which it may come into contact during normal use as a touch position sensitive screen. Other organic polymers were evaluated but did not possess the combination of properties required for a useful coating material.

The presence of a dirt resistant, aesthetically attractive coating that is cohesively bonded to the surface contacted by the user is one of the features that distinguishes the waveguides of this invention from prior art waveguides such as those disclosed in the patent to Kasday cited hereinbefore.

Polyurethanes prepared from aromatic diisocyanates and polyether based polyols are preferred coating materials. Polyurethanes of this type is available from the B. F. Goodrich Company as Estane ® 58881 compound and 58887 compound.

Another class of useful coating materials are the known dirt-resistant organosiloxanes block copolymers. A preferred type of copolymer is described in U.S. Pat. No. 3,639,155, which issued to Hartlein et al. on Feb. 1, 1972. This patent is incorporated herein by reference as a teaching of suitable coating materials for the optical waveguides of this invention. Briefly summarized, the copolymers of Hartlein et al. consist essentially of from 40 to 75 mole percent of diorganosiloxane units, at least 80 mole percent of which are dimethylsiloxane; from 15 to 50 mole percent of organosiloxane units containing an average of from 1 to 1.3 silicon-bonded hydrocarbon radicals per unit selected from aryl, vinyl, ethyl, methyl and propyl, at least 50 mole percent of these radicals being aryl; and from 3 to 25 mole percent of terminal units containing an average of from 1.8 to 2 silicon-bonded hydrolyzable groups per unit. These materials cure upon exposure to moisture to yield dirt resistant coatings. Other dirt-resistant organosilicon polymers are known, and do not form part of this invention.

A second type of dirt-resistant polyorganosiloxane coating is described in U.S. Pat. No. 4,472,470. which issued to Modic on Sept. 18, 1984.

Organosiloxane/urethane copolymers useful as coatings for the present optical waveguides are sufficiently described in patents and other literature that a detailed discussion of these materials is not necessary in this specification. Various embodiments of these copolymers are taught, for example in U.S. Pat. No. 3,562,352, which issued to Nyilas on Feb. 9, 1971, U.S. Pat. No. 4,057,595, which issued to Rauner et al. on Nov. 8, 1977 and U.S. Pat. No. 4,528,353, which issued to Kira on July 9, 1985.

To achieve the desired combination of aesthetic and tensile properties, compressive strength and tear resistance the coating should be at least about 0.25 millimeters thick. The coating can be applied using a solubilized or molten coating material and conventional techniques, including dipping, spraying and the use of doctor blades. To ensure uniformity of thickness over the entire surface of the waveguide the coating material can be applied as a preformed solid film. If a preformed film is used to form the coating, the film can be embossed to provide a matte finish. This type of finish reduces the amount of glare reflected toward a viewer of the information being transmitted through the waveguide from a CRT or other optical display.

C. Fabrication of the Optical Waveguide

The waveguides of this invention are fabricated by applying one of the coating materials described in the precoding section B to at least one surface of a cured polyorganosiloxane elastomer prepared using the compositions described in the preceding section A. For proper operation of the waveguide it is essential that the coating material be cohesively bonded to the elastomer layer. To ensure a sufficiently high degree of adhesion between elastomer and coating, it may be desirable to apply a primer before applying a liquid coating composition or preformed solid film to the surface of the elastomer layer. The primer can be, for example, a liquid silane or siloxane having functional groups that react with groups present in the elastomer and/or the coating material.

A preferred class of primers includes (1 ) polyorganohydrogensiloxanes and copolymers containing diorganosiloxane and organohydrogensiloxane units, and (2) silanes containing at least two alkoxy groups per molecule. It may be desirable to include a second reactive group such as vinyl or acryloxy in the silane molecule. Typically these primers are applied as a solution in a liquid hydrocarbon such as toluene or xylene or a halogenated hydrocarbon such as one of the chlorinated methanes or ethanes. The solution also includes a catalytically effective amount of one of the platinum compounds described hereinabove.

Trimethylsiloxy terminated polymethylhydrogensiloxanes and copolymers containing dimethylsiloxane and methylhydrogensiloxane units are preferred primers. If the coating material is applied as a preformed film, the primer composition can be coated onto the film, the elastomer or both of these substrates.

In accordance with a preferred method for fabricating the present waveguides, two sheets of polyurethane film are each coated on one side using one of the aforementioned primers. The edges of the sheets are then bonded together such that the coated sides form the inner walls of a compartment or pouch that is at least equal in dimensions to the final waveguide. The required volume of a curable liquid composition described in the foregoing section A of this specification is then placed in the pouch and the composition is cured by heating the pouch in a mold cavity having substantially the same height as the thickness of the final waveguide. The mold is typically heated to a temperature of at least 60° C. for a time period sufficient to cure the liquid composition to an elastomer. The final waveguide is cut or stamped out within the boundary along which the two polyurethane films were initially bonded to one another. This process exposes a surface of cured elastomer around the perimeter of the waveguide. In an alternative embodiment of this process two or more waveguides can be fabricated from a single pouch of cured elastomer.

The surface of cured elastomer exposed at the perimeter of optical waveguides prepared as described in the preceding paragraph may exhibit a "tackiness" characteristic of this class of materials. If the tackiness is objectionable, it can usually be removed by coating the perimeter of the waveguide with an organohydrogensiloxane and a catalytically effective amount of one of the platinum compounds described hereinabove. In preferred embodiments the coating composition includes a compound containing silicon-bonded vinyl radicals. The coated surface should then be heated sufficiently for the organohydrogensiloxane to cure to a solid material. It appears that at least a portion of the organohydrogensiloxane reacts with the elastomer. Other curable organosiloxane compositions yielding tack-free, dirt resistant cured coatings can be used in place of a catalyzed organohydrogen-siloxane composition. These compositions have been described hereinbefore as suitable coating materials for the present waveguides.

D. The Properties of the Optical Waveguide

The properties of the final waveguide will be determined in part by the necessity to withstand repeated compression of one surface by user's fingers and, possibly, pointed objects such as pencils and ball point pens. The coating on this surface must therefore be resistant to both puncturing and tearing under these conditions.

The surface of the waveguide which is contacted by the user should be able to recover its initial contour and retain its integrity after being subjected to a force sufficient to deflect it a distance of 2 millimeters while the opposite surface of the waveguide is resting on a substantially flat, stationary surface. The force is applied using the circular surface of a 0.8 mm.-diameter cylinder, which is equivalent to the point of an automatic pencil or fine tip ball point pen.

In order to achieve a reasonable service life the present waveguides should resist fracturing under a load of 5 kilograms applied against a coated surface using a modification of ASTM test method No. D 575-81. The modification consists of replacing the specified tool with a 1.6 cm-diameter metal sphere.

To function effectively a touch position sensitive optical waveguide of this invention must be sufficiently resilient to recover at least 95% of its initial thickness within one second after being compressed up to 50% of its initial thickness for as long as one minute. If this requirement is not met, there could be an unacceptable decrease in the maximum rate at which successive selections can be made from menus displayed on the face of the CRT or other visual read out device used in conjunction with the waveguide.

The optimum properties for optical waveguides intended for use as touch position senstive screen are to a large extent subjective values determined by user preference. User preference tests conducted in connection with the development of the present optical waveguides indicate that a majority of users prefer to be able to deflect the surface of the waveguide a distance of at least one millimeter by exerting light to moderate finger pressure, which is equivalent to applying a force of from about 50 to about 300 grams to compress a 4 6 mm.-thick waveguide to about 20% of its original thickness.

It will be understood by those skilled in the art that the hardness, compressibility and resiliency of a coated elastomer substrate such as the present waveguides are determined by the properties of the coating and the elastomer layer as well as the interaction between these two parts of the waveguide. Selecting an optimum combination of elastomer, coating material and thickness values for these materials requires only a minimum of routine experimentation by one having knowledge of the present invention.

The following examples disclose preferred embodiments of the optical waveguides of this invention, and should not be interpreted as limiting the scope of the invention as defined in the accompanying claims. In the examples, all parts and percentages are by weight unless otherwise specified.

EXAMPLE 1

This exmaple describes a preferred curable polyorganosiloxane composition for preparing the waveguides of this invention.

The following materials were blended to form a homogeneous composition:

56.0 parts of a dimethylvinylsiloxy endblocked polydimethylsiloxane having a viscosity of about 2.1 Pa.s at 25° C. (ingredient I);

44.0 parts of a dimethylvinylsiloxy endblocked polydimethylsiloxane having a viscosity of about 30 Pa.s at 25° C. (ingredient II);

45.2 parts of a resinous benzene soluble copolymer containing triorganosiloxy units and $SiO_2$ units in the molar ratio of about 0.7 mol of triorganosiloxy unit per mol of $SiO_2$ unit where the triorganosiloxy units are trimethylsiloxy units and dimethylvinylsiloxy units and the resin copolymer has from 1.4 to 2.2 weight percent silicon-bonded vinyl radicals (ingredient III);

7.85 parts of a dimethylhydrogensiloxy endblocked polydimethylsiloxane containing an average of 20 dimethylsiloxane units per molecule;

2.94 parts of a trimethylsiloxy endblocked dimethylsiloxane/methylhydrogensiloxane copolymer exhibiting a viscosity of 0.3 Pa.s and containing 0.16 percent by weight of silicon-bonded hydrogen atoms (ingredient IV);

0.3 parts of a hexachloroplatinic acid complex of sym-divinyltetramethyldisiloxane diluted with an amount of a liquid dimethylvinylsiloxy endblocked polydimethylsiloxane sufficient to provide 0.7 weight percent platinum (ingredient V); and 0.2 part of cyclic methylvinylsiloxane oligomers as a platinum catalyst inhibitor (ingredient VI).

The molar ratio of vinyl radicals to silicon-bonded hydrogen atoms in this composition was 2.3.

A container was fabricated by clamping two superimposed sheets of polyurethane film against a metal plate. The polyurethane is available as Estane® 58887. The sheets measured 46 by 47 cm. and were 0.5 mm. thick. The surface of each sheet that formed one of the inner walls of the container was coated with a primer solution prepared by combining 120 grams of dry methylene chloride, 13.5 grams of a trimethylsiloxy endblocked polymethylhydrogensiloxane having a viscosity of about 0.13 Pa.s at 25° 0 and a silicon-bonded hydrogen atom content of about 1.6 percent by weight, and 2 drops of a chloroplatinic acid complex of divinyltetramethyldisiloxane diluted with a dimethylvinylsiloxy endblocked polydimethylsiloxane to provide 0.7 weight percent platinum.

The sheets of film were secured to a metal plate along three of the four mating edges by means of 3.2 mm-thick metal strips that extended along the entire length of each edge, and clamped the films between the strips and the metal plate. The unsecured side of the films formed the mouth of the container, which was oriented in an upward direction to allow filling of the container with the composition prepared as described in the first part of this example.

The entire surface of the exposed side of the filled container was covered with a polycarbonate plate that was secured to the aforementioned metal plate. The two plates were separated by a distance equal to the thickness of the two films and the thickness of the aforementioned strips. The resultant assembly was transferred to an oven while maintaining the container in an upright position to avoid spillage of the curable composition. The temperature within the oven was 66° C. and the container remained there for 30 minutes to cure the composition to an elastomer. The container was then removed from the oven. A section measuring 18.3 by 23.4 cm. was cut from the container of cured elastomer to form a waveguide of this invention. The layer of exposed elastomer around the perimeter of the waveguide was coated using the same solution used to coat the film from which the waveguide was prepared. The waveguide was then heated at a temperature of 66° C. for one hour to cure the coating and complete curing of the elastomer.

When cured for 20 minutes at 150° C. in the absence of the polyurethane film the elastomer exhibited a hardness of 11 on the Shore 00 durometer scale.

The final optically transparent waveguide was 4.6 mm thick, and required a force of 117 g. applied using a 1.6 cm-diameter spherical foot to depress the surface of the waveguide a distance of 1 mm. The waveguide required less than one second to recover its initial thickness following removal of this force.

The compressive strength of the waveguide was measured by determining the force required to fracture the surface of the waveguide using a 1.6 cm-diameter spherical foot. This force was 17.6 kilograms.

The waveguide was then subjected to an accelerated aging test by heating it at 66° C. for 46 days to determine whether the compressibility of the waveguide changed under these conditions. After 14 days the force required to compress a surface of the waveguide a distance of 1.0 mm was 123 grams. After 49 days this force had increased to 130 grams. This represented an increase of 5 percent from the initial value of 117 grams.

EXAMPLE 2 (COMPARATIVE EXAMPLE)

This example demonstrates the disadvantages associated with using prior art curable compositions containing a stoichiometric excess of silicon hydrogen atoms to prepare the elastomer portion of an optical waveguide. The composition is one of those disclosed in U.S. Pat. No. 4,535,141, which issued to Kroupa on Aug. 13, 1985.

The external portion of the waveguide was a container formed by heat sealing a sheet of the polyurethane film described in the preceding Example 1 to each side of a rectangular frame formed from the same material. The inner dimensions of the frame were 16.4 cm. by 21.3 cm., and the frame was 0.5 cm. thick. The surfaces of the film forming the inner wall of the container were coated with the primer solution of example 1 along the entire border where the film contacted the frame. The resultant container was filled with a curable composition prepared by combining together the folowing materials to form a homogeneous mixture.

100 parts of a mixture of three dimethylvinylsiloxy terminated polydimethylsiloxanes identified as (a), (b) and (c).

polydimethylsiloxane (a) constituted 35 percent by weight of the mixture and exhibited a viscosity of about 2 Pa.s at 25° C., polydimethylsiloxane (b) constituted 52 percent by weight of the mixture and exhibited a viscosity of about 30 Pa.s at 25° C., and polydimethylsiloxane (c) constituted the remaining 13 percent by weight of the mixture and exhibited a viscosity of about 0.4 Pa.s at 25° C.;

19 parts of the resinous benzene soluble copolymer identified as ingredient III in the preceding Example 1, 0.7 part of a crosslinking agent consisting essentially of a trimethylsiloxy endblocked dimethylsiloxane/-methylhydrogensiloxane copolymer having an average of five methylhydrogensiloxane units and three dimethylsiloxane units per molecule and a silicon-bonded hydrogen atom content in the range of about 0.7 to 0.8 weight percent;

28 parts of the dimethylhydrogensiloxy terminated polydimethylsiloxane described in the preceding Example 1;

0.18 part of the platinum-containing hydrosilation catalyst identified as ingredient V in Example 1; and 0.26 part of ingredient VI of Example 1.

The molar ratio of vinyl radicals to silicon-bonded hydrogen atoms in this composition was 0.365.

The filled container was secured between two plates separated by 46 mm-thick spacers and the entire assembly was stored at room temperature for 8 hours to cure the elastomer, followed by a postcure period of 2 hours in an oven maintained at a temperature of 66° C.

The cured product was an optically transparent waveguide of about 4.6 mm in thickness and required a force of 55 grams to depress the surface a distance of 1 mm. The waveguide was subjected to the accelerated aging test described in the preceding Example 1. After 7 days the force required to depress the surface of the waveguide has increased to 110 grams. After 28 days this force was 400 grams, an increase of 727 percent from the initial value. User acceptance tests have demonstrated that exerting this amount of force to depress the surface of a touch sensitive optical waveguide would not be acceptable to a potential user of the waveguide.

EXAMPLE 3

This example describes a composition of this invention that does not contain a diorganohydrogensiloxy terminated polydiorganosiloxane as a chain extender and the lower compressive strength of the resultant waveguide relative to one prepared using a preferred composition of this invention which contains the chain extender.

A curable composition was prepared by blending the following amounts of ingredients I to VI defined in the preceding example 1 to obtain a homogeneous mixture.

| Ingredient | Parts |
| --- | --- |
| I | 57 |
| II | 43 |
| III | 46 |
| IV | 7.7 |
| V | 0.3 |
| VI | 0.2 |

The molar ratio of vinyl radicals to silicon-bonded hydrogen atoms in this composition was 3.0.

A sample of this composition was cured outside of the container by heating it for 20 minutes at 150° C. The durometer hardness of this cured material was 20 on the Shore 00 scale.

A waveguide was prepared using this curable composition together with the procedure and polyurethane film described in the preceding Example 1. The compressive strength of the waveguide following postcuring was 6.75 kilograms, compared with 17.6 kg. for the waveguide described in Example 1, which was prepared using a preferred curable composition containing a chain extender. In both instances the force was applied using a 1.6 cm.-diameter spherical foot.

That which is claimed is:

1. A transparent touch position sensitive optical waveguide exhibiting a thickness of at least 2.5 mm and consisting essentially of a layer of cured, fracture resistant, resin reinforced polyorganosiloxane elastomer having two substantially parallel major surfaces, at least one of which is bonded to a dirt- and puncture resistant coating, where said elastomer exhibits a hardness of from 0, measured using the Shore 00 durometer scale, to a value of 10, measured using the Shore A durometer scale, and is the product of a hydrosilation reaction between the ingredients of a composition comprising:

A. at least one liquid polydiorganosiloxane exhibiting a viscosity of from 0.1 to 40 Pa.s at 25° C. and containing either a vinyl radical or a silicon-bonded hydrogen atom at each of the two terminal positions;

B. an amount of an organosiloxane crosslinking agent sufficient to produce said elastomer by a hydrosilation reaction between said crosslinking agent and the other ingredients of said composition;

C. from 5 to about 40 percent, based on the total weight of said composition, of a benzene soluble resinous copolymer comprising triorganosiloxy units of the general formula $R''_3SiO_{\frac{1}{2}}$, diorganovinylsiloxy units of the general formula $CH_2{=}CH(R''')_2SiO_{\frac{1}{2}}$, and $SiO_2$ units, where $R''$ and $R'''$ are individually monovalent hydrocarbon or halohydrocarbon radicals containing from 1 to about 20 carbon atoms and free of ethylenic unsaturation, the molar ratio of combined triorganosiloxy units and diorganovinylsiloxy units to $SiO_2$ units is from 0.7 to 1.2 and said copolymer contains from 0.1 to 8 weight percent of silicon-bonded vinyl radicals; and D. a platinum-containing hydrosilation catalyst in an amount sufficient to cure said composition to said elastomer;

where the molar ratio of silicon-bonded hydrogen atoms to vinyl radicals in said composition does not exceed 1:1, said coating is formed from a polymeric material selected from the group consisting of (a) polyurethanes derived from aromatic, aliphatic or cycoaliphatic diisocyanates and organic polyols, (b) polyorganosiloxane and (c) block copolymers comprising (1) repeating units of a polyurethane and (2) up to 50 mole percent, based on total repeating units in said block copolymer, of diorganosiloxane units; and where a coated surface of said waveguide resists fracturing under a force of 5 kilograms applied using a 1.6 cm.-diameter sphere the compressibility at any point on a coated surface of the waveguide is such that the force required to depress said surface a distance of 1 mm is no greater than 200 grams applied using a 1.6 cm.- diameter sphere, and the waveguide recovers at least 95% of its initial thickness within one second after being compressed up to 50% of its initial thickness for a period of up to one minute.

2. A waveguide according to claim 1 wherein said polydiorganosiloxane is represented by the general formula

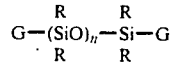

where R represents a monovalent hydrocarbon radical or a monovalent halohydrocarbon radical, G represents hydrogen or a vinyl radical, and n represents a degree of polymerization equivalent to a viscosity of from 0.1 to about 40 Pa.s at 25° C. and the crosslinking agent comprises an organohydrogensiloxane containing an average of at least three silicon-bonded hydrogen atoms per molecule.

3. A waveguide according to claim 2 where G is vinyl, R represents a monovalent hydrocarbon radical containing from 1 to 10 carbon atoms, said organohydrogensiloxane contains at least three repeating units per molecule that are selected from the group consisting of $HSiO_{1.5}$, $R'HSiO$ and $R'_2HSiO_{0.5}$, where $R'$ represents a monovalent hydrocarbon radical containing from 1 to 10 carbon atoms, any remaining repeating units are selected from the group consisting of monoorganosiloxane, diorganosiloxane, triorganosiloxy and SiO$_2$, and the molar ratio of vinyl radicals to silicon-bonded hydrogen atoms in said composition is at least 2:1.

4. A waveguide according to claim 3 where said composition exhibits a viscosity of up to 100 Pa.s at 25° C., and R, R', R" and R'" are methyl, phenyl or 3,3,3-trifluoropropyl.

5. A waveguide according to claim 4 where R, R', R" and R'" are methyl, the crosslinking agent comprises a dimethylsiloxy/methylhydrogensiloxy copolymer containing an average of from 10 to 50 repeating units and from 3 to 5 silicon-bonded hydrogen atoms per molecule, the composition includes a dimethylhydrogensiloxy terminated polydimethylsiloxane containing an average of from 10 to 50 repeating units per molecule and providing from about 10 up to 85 mole percent of the silicon-bonded hydrogen atoms present in said composition, the molar ratio of vinyl radicals to silicon-bonded hydrogen atoms present in said composition is from 2:1 to 4:1, said platinum-containing hydrosilation catalyst is a reaction product of hexachloroplatinic acid and a vinyl containing organosiloxane compound, and said coating is formed from a polyurethane derived from an aromatic diisocyanate.

6. A waveguide according to claim 5 where said composition contains two of said liquid polydiorganosiloxanes, the first of which exhibits a viscosity of from 0.1 to 3 Pa.s at 25° C. and the second of which exhibits a viscosity of from 20 to 40 Pa.s at 25° C., said dimethylhydrogensiloxy terminated polydimethylsiloxane contains from 30 to 70 mole percent of the silicon-bonded hydrogen atoms present in said composition and said coating is a preformed film of said polyurethane.

7. A waveguide according to claim 6 where said composition contains a platinum catalyst inhibitor.

8. A waveguide according to claim 7 where said platinum catalyst inhibitor is an acetylenic alcohol.

9. A waveguide according to claim 6 where said film has been bonded to said elastomer using a primer selected from the group consisting of polyorganohydrogensiloxanes, copolymers containing diorganosiloxane and organohydrogensiloxane units and silanes containing at least two alkoxy groups per molecule.

10. A waveguide according to claim 6 where the elastomer exposed at the perimeter of the waveguide is rendered dirt resistant by reaction with at least one organosilicon compound.

11. A waveguide according to claim 10 where said organosilicon compound is a copolymer consisting essentially of diorganosiloxane and organohydrogensiloxane units and said reaction is carried out in the presence of a platinum-containing hydrosilation catalyst.

12. A waveguide according to claim 6 in the form of a touch position sensitive screen for use in conjunction with a synchronized light source.

* * * * *